(12) United States Patent
Goodman et al.

(10) Patent No.: US 7,281,266 B2
(45) Date of Patent: *Oct. 9, 2007

(54) PERSONAL COMPUTER INTERNET SECURITY SYSTEM

(75) Inventors: Reginald A. Goodman, Pasadena, TX (US); Scott R. Copeland, Houston, TX (US)

(73) Assignee: Exobox Technologies Corp., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/591,112

(22) Filed: Oct. 31, 2006

(65) Prior Publication Data

US 2007/0044148 A1 Feb. 22, 2007

Related U.S. Application Data

(63) Continuation of application No. 10/656,570, filed on Sep. 5, 2003, now Pat. No. 7,146,640.

(60) Provisional application No. 60/430,438, filed on Dec. 2, 2002, provisional application No. 60/413,962, filed on Sep. 26, 2002, provisional application No. 60/408,456, filed on Sep. 5, 2002.

(51) Int. Cl.
*G06F 7/04* (2006.01)
*G06F 15/173* (2006.01)
*H04L 9/00* (2006.01)
*G06F 12/00* (2006.01)
*G06F 11/30* (2006.01)
*G06F 7/02* (2006.01)

(52) U.S. Cl. .................. 726/16; 713/176; 709/223
(58) Field of Classification Search .................. 726/16; 713/176; 709/223
See application file for complete search history.

(56) References Cited

U.S. PATENT DOCUMENTS 6,526,488 B1 * 2/2003 White et al. .................. 726/26
2002/0069369 A1 * 6/2002 Tremain ..................... 713/201

* cited by examiner

FOREIGN PATENT DOCUMENTS

WO    WO 3010922 A1 * 2/2003

OTHER PUBLICATIONS

Reiner Sailer, Trent Jaeger, Xiaolan Zhang, and Leendert van Doorn, "Operating Systems Security: Attestation-based policy enforcement for remote access", Proceedings of the 11th ACM conference on Computer and Communications Security CCS'04, Oct. 2004, pp. 308-317.*

*Primary Examiner*—Matthew Smithers
*Assistant Examiner*—Courtney D. Fields
(74) *Attorney, Agent, or Firm*—Osha Liang LLP

(57) ABSTRACT

A software application installable on a personal computer protects the computer's primary data files from being accessed by malicious code (e.g., viruses, worms and trojans) imported from an external data source, such as the Internet. A master file serves as the image from which all other software code and functions are derived. Activation of the master image file establishes a secondary operating environment (isolation bubble) in which a secondary operating system including a browser and any other desired applications are installed and run. Access permissions for communications between the computer at large (primary operating system) and the secondary operating system to prevent any access to the files on the primary operating system from any operations originating from the secondary operation system. Activation of the secondary operating system is required before any connection to the Internet (or other external data source) is enabled.

20 Claims, 10 Drawing Sheets

PERSONAL COMPUTER INTERNET SECURITY SYSTEM

This application claims priority under 35 U.S.C. § 120 from and is a continuation application of U.S. patent application Ser. No. 10/656,570 filed Sep. 5, 2003 now U.S. Pat. No. 7,146,640, which claims priority under 35 U.S.C. § 119 from Provisional Patent Applications No. 60/408,456 filed Sep. 5, 2002, 60/413,962 filed Sep. 26, 2002, and 60/430,438 filed Dec. 2, 2002.

FIELD OF THE INVENTION

The present invention is in the field of support for electrical computers and digital processing systems. More specifically, the present invention relates to security software and processes for protecting a personal-type computer system's hardware, software and data from destruction, unauthorized modification or unauthorized access due to malicious computer code derived from an external data source.

BACKGROUND OF THE INVENTION

It is well known that computer systems are subject to attack by intruders who utilize malicious computer code downloaded onto the system to steal or corrupt data or applications resident on a computer system, or to otherwise compromise the integrity of the system. Both network and stand alone computer systems are subject to such intrusion. The intrusion typically is the result of malicious code gaining access to and changing the content of a portion of the computer system's control software. Because the lost or compromise data and the cost of recovering from such intrusions can be excessive and even devastating, The field has been and continues to be highly motivated to develop technologies which deduce or prevent susceptibility to these attacks.

U.S. Pat. No. 6,578,140 to Helbig, Sr. is an example of a method and apparatus for enhancing a computer system's security from intrusion by an intruder's malicious code. However, the Helbig technology at least in part is hardware dependent in that it requires a coprocessor device and multi-logic controller circuit to accomplish its utility. Another example of a hardware dependant security technology is disclosed in U.S. Pat. No. 6,578,140 to Policard. The Policard technology comprises two separate mother boards with CPUs and two separate operating systems housed together in a single case, with the two CPUs and operating sharing ancillary and/or peripheral hardware (e.g., printer, modem, monitor and keyboard). However, this technology requires duplication of certain central components, which can add appreciable to the cost of implementing the technology. Generally, any solution which requires or is hardware driven will tend to add cost to the implementation of the technology, and potentially complicate retrofitting the technology to an existing computer system.

Recognizing the benefit of a software driven solution to the intrusion problem that does not require adding hardware to the system, the field has developed non-hardware dependent computer security technologies. Examples of non-hardware dependent computer system technologies include U.S. Pat. No. 6,526,488 to White et al. White describe a software driven method for controlling access to and corruption of information on a computer system cause by a PC virus. The White technology works by dividing all stored data into partitions, at least one of which is a "write recoverable" partition. If a command is issued to write to or modify any data stored in a "write recoverable" partition, the command is executed else and the new or changed data is accessed for the remainder of the session, with modifying the "write recoverable" partition. However, this technology requires the establishing such partitions, and moving existing data to them, and does not protect any data that is not in a "write recoverable" partition.

Another example of a software driven security is U.S. Pat. No. 6,480,962 to Touboul. Touboul describes a system and method for protecting a client computer system during runtime from hostile downloadables. A hostile downloadable is data imported from an external data source (e.g., the Internet) that contains malicious computer code. According the Touboul method, the computer system includes a set of security rules defining suspicious activities and a set of security actions to be taken in response to detecting violation of the security rules. White defines suspicious action as write operations to a system configuration file, overuse of memory or processor time, etc. However, the Touboul technology is "table" or "list" dependent. If an action is not a violation of the list or table of suspicious actions, the action cannot be prevented. Also, it is possible that innocent or otherwise appropriate action appears or tracks as suspicious action and is prevented as a violation of the security rules.

Although each of the above noted technologies may be useful in accomplishing their intended purpose, there is still the serious need in the field for more alternative computer system security technologies that provide more comprehensive solutions to the problem of intrusion via malicious computer code from external sources (e.g., the Internet). Therefore, it would be beneficial to the field to have a software drive computer system security technology that was relatively hardware independent, i.e., does not require addition of components to an existing computer system in order to accomplish its utility. Additionally, it would be beneficial to have a software driven computer system security technology that is not database (or list or table) dependant, and does not require the repartitioning of the existing data or file structure on the computer system.

SUMMARY OF THE INVENTION

The present data security technology eradicates the threat potential of malicious code downloaded from an external data source onto a personal computer or the like. Malicious code includes viruses, trojans, worms and such that may be loaded onto a computer from an external data source, such as the Internet, a network or an external data device (i.e., a floppy drive, CD ROM disc, etc.). A computer with an application of the present inventive software technology installed, will remain completely safe from intrusion from all currently known hacker intrusion technologies. There can be no file theft, data corruption, or nuisance applications (e.g., viruses) run on the computer. Nor will there be the downtime and technical service costs required to recover from exposure to these malicious codes.

The present inventive software technology does not rely on file scanners, virus definition patterns, Cyclical Redundancy Checks (CRC) checks, Name Address Translations (NAT), or similar strategies of current database driven security technologies. Rather, the present inventive software technology exploits certain immutable hardware and software communication relationships underlying and basic to the system architecture of a computer to insure intrusion prevention. Because the present inventive software technology is not database driven, it does not require malicious code definition updates. Therefore, it is not susceptible to new malicious codes or to mutation of existing malicious codes. Further, hackers, cyber-terrorists and internet predators cannot breech a computer system running the present inventive software even if they possessed the source code and the complete design specifications. Again, this is because the security features of the present invention are not database dependent, but derive from the intrinsic architectural relationships of the computer's hardware and operating system software. Implementation of the present inventive software technology is uncomplicated. If the user computer is on an intranet network, in most cases installation of the present inventive software will not require modifications of the user's existing intranet network.

A computer system comprising the present personal computer Internet security software includes the typical elements and features of a personal computer, such as a CPU; a data storage device (e.g., a hard drive); a temporary memory means (e.g., RAM); and an operating system (herein, the primary operating system or POS, e.g., WINDOWS XP®). Additionally, a computer system comprising the present inventive software technology includes a software application embodying the present invention and at least one I/O connection in operative communication with an external data source. Typically, the external data source will be a global computer network (i.e., the Internet). However, other external data sources are anticipated by the present invention, such as an intranet, a local area network and a wide area network, as well as another computer personal-type computer or work station (e.g., a peer-to-peer connection), a removable data storage device (i.e., a floppy disc, a CD ROM disc or other removable data storage media).

The present inventive software provides an intrusion secure personal computer system by establishing a separate and substantially closed, isolated secondary operating environment (SOE) on the computer. Included within the isolated operating environment is a second operating system (SOS), functioning substantially separate from the primary operating system and controlling computer operations within the isolated operating environment. The isolated operating environment includes an allocation of volatile memory (RAM) and data storage (on a data storage device, e.g., hard drive) to the secondary operating system. It is within the isolation of the isolated operating environment that all access to and manipulation of any data from an external data source occurs. The present inventive software includes coding as necessary to limit or modify operation of the primary operating system to accomplish this isolation of any externally derived code to the isolated operating environment under control of the secondary operating system.

The isolated operating environment includes along with the second operating system, the SOS's associated software applications, such as a browser and e-mail applications. Other software applications may be included within the isolated operating environment under control or the SOS, including word processing, spread-sheet, games and other software applications as a user may desire. Inclusion of these other software applications is limited only by the size of the isolated operating environment, the design parameters of the secondary operating system and the system specification of the user's computer.

The present invention includes a method for securing the primary data on a personal computer from intrusion by malicious code derived from an external data source. Generally, the method comprises the steps of: first installing a software application embodying the present inventive software on the subject computer. Then the software application is executed to initially establish the isolated operating environment on the computer, the isolated operating environment including a secondary operating system, and ready for activation. Subsequently initiating an external data source interface session activates further execution the software application, including allocating volatile memory (in RAM) and temporary data storage (on a data storage device) to the secondary operating system. Once the isolated operating environment conditions are set and control of the computer vested in the SOS, connectivity with the external data source is established under control of the secondary operating system. This isolates all operative communication with the external data source to the secondary operating system contained within the isolated operating environment, which secures the data and file structure of the primary operating system of the computer from intrusion from the external data source, or any other user activities occurring in the isolated operating environment under control of the SOS.

DETAILED DESCRIPTION OF THE INVENTION

Figure 1:
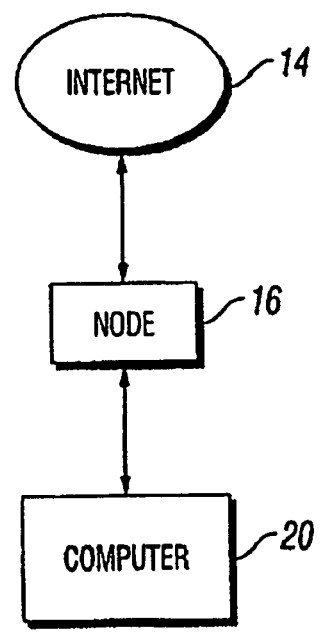
FIG. 1 is a block diagram of a typical overall connection scheme between a stand-alone computer and the Internet.

Referring now to the drawings, the details of preferred embodiments of the present invention are graphically and schematically illustrated. Like elements in the drawings are represented by like numbers, and any similar elements are represented by like numbers with a different lower case letter suffix.

Figure 2:
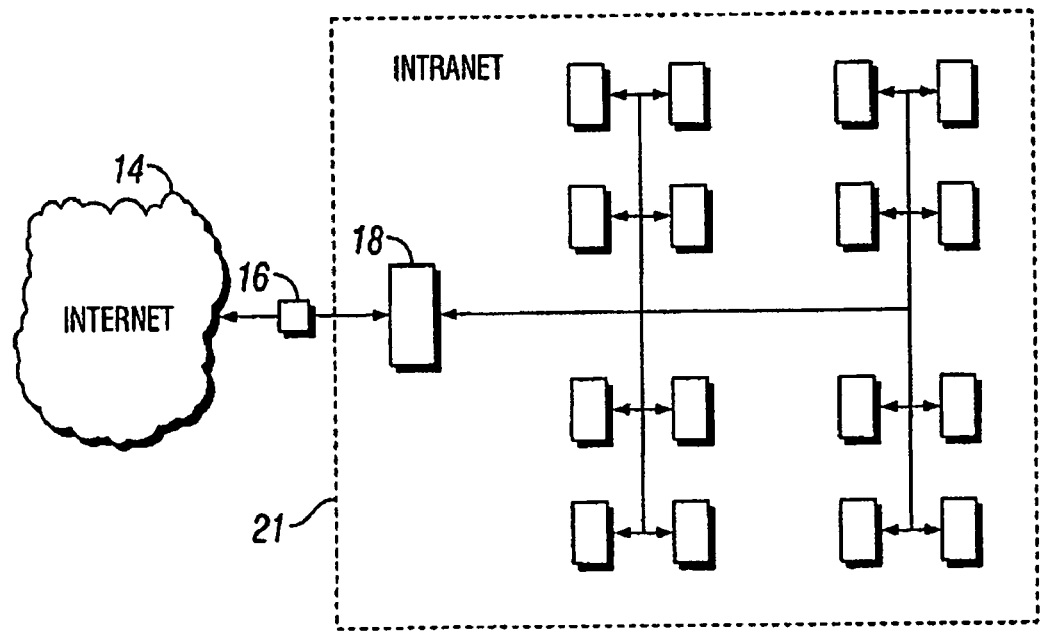
FIG. 2 is a block diagram of a typical overall connection scheme between an Intranet and the Internet.

The present Personal Computer Internet Security System protects the files of a user's stand-alone or personal computer from being affected by any malicious code contained in a file downloaded from an external data source, such as the Internet, and from being accessed from the Internet (e.g., via a "trojan"). Although the present system 10 comprises a stand-alone computer device such as a PC as shown in FIG. 1, it can be adapted to a computer network, such as an Intranet as shown in FIG. 2. As shown in FIGS. 1 and 2, the Internet 14 is typically accessed by a computer 20 (or for an intranet 18, by an internet server 21, see FIG. 2) via an Internet node 16. Depending on the configuration of the computer 20 (or the intranet 18), the node 16 represents a device or devices such as a modem, a network card, a router and similar interface hardware for connecting the computer 20 (or the intranet 18) to the Internet 14. In the example of FIG. 2, the Intranet 20 interfaces with the Internet 14 via an Internet server computer 18.

Figure 3:
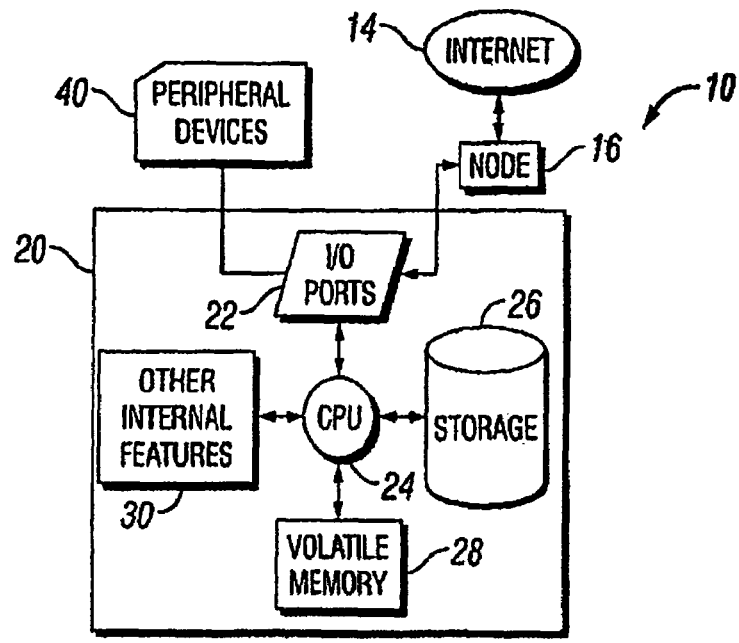
FIG. 3 is a block diagram of a general interconnect scheme for certain internal components of a typical computer.

The present inventive software technology is intended for practice with a stand-alone computer system, such as a personal computer (PC) 20 as in FIG. 3. The computer or PC 20 can be of any configuration or manufacture, including deck-tops, lap-tops or other devices having a CPU, storage and connectivity to the Internet. In a preferred simple embodiment as exemplified in FIG. 3, the present system 10 comprises a computer 20 to which is connected certain peripheral devices 40, such as a keyboard, monitor and printer through a number of input/output (I/O) ports 22. Also connected to the computer via an I/O port is an Internet node 16. The node device 16 can be any of a number of such devices known in the art and compatible with the configuration of the computer 20 to which it is attached to accomplish this purpose, such as modems and routers. Although the peripheral devices 40 and the node 16 are illustrated in the example of FIG. 3 as external to the computer 20, it is intended and is appreciable by one of ordinary skill in the art that these elements can be incorporated into or share the same housing as the computer 20 to one degree or another. The structure and function of the other computer components and their connectivity and communication interrelationships are typical of the field and known to one of ordinary skill in the art. Control of the Internet node 16 and other peripheral devices 40 is typically accomplished in the usual manner via the computer 20 to which they are attached. In addition to the I/O ports 22, the computer 20 comprises the other internal features and components typical of a PC, such as a central processing unit (CPU) 24, one or more data storage devices 26, volatile memory (e.g., RAM) 28, and other internal features and components 30.

Figure 4A:
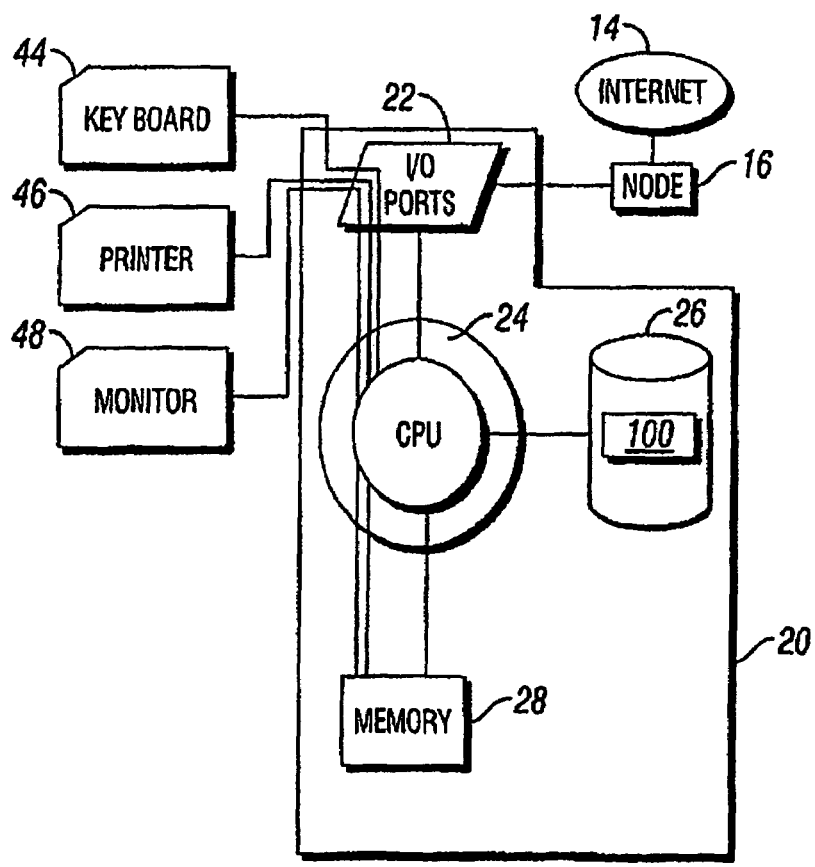
FIG. 4A is a block diagram showing the interconnect scheme for certain internal components of a typical PC-type computer system with a software application embodying the present invention loaded into a data storage device (hard drive) of the computer.

FIG. 4A is a more detained illustration of a stand-alone, PC-type computer 20 comprising the present inventive software technology. In the example, the combined computer and software application system 10 is illustrated in an off-line condition, i.e., as a PC-type computer system would be configured after installation of the software application, but prior to its initial execution or prior to establishing a connection to the Internet 14. As indicated in FIG. 4A, in the off-line condition, all of the internal and peripheral components and features are interconnected and under control of the CPU 24 and the computer's primary operating system, as is typical. Further, the software application 100 for defining the isolated operating environment feature of the combined system 10 is installed/loaded on a storage device 26 of the computer 20. The storage device could be a hard-drive as shown, an auxiliary drive (e.g., a floppy or CD drive, not shown), a chip (such as an EPROM, CMOS, etc.), a kernal, firmware or other storage means. The ordinary skilled artisan is able to select and practice a storage means appropriate for the present invention and install the master image file on the storage means.

As also shown in FIG. 4A, in the off-line condition, the computer 20 does not have connectivity with the Internet, illustrated by the lack of a connection from the CPU 24 through the I/O ports 22 to the node 16. Additionally, FIG. 4A shows the software application 100, which defines the secondary operating environment, is installed in a storage location 26 on the computer 20, but is not yet activated (i.e., no active communication link with the CPU 24). In the off-line or initial installation condition, the computer 20 is substantially similar in configuration and operation to a typical computer of its type.

Again as shown in FIG. 4A, the present inventive security software system is preferably embodied in a software application 100 loadable onto a data storage device 26 of a computer 20. In a preferred embodiment, the data storage device 26 was the hard drive of the computer 20. However, the data storage device 26 can be other than a hard drive, and alternatives currently known and to be developed in the future are readily selectable by one of ordinary skill in the art (e.g., a USB data storage device) for practice in the present invention. The software application 100 has a plurality of sub-applications or sub-routines (100a to 100n) as are necessary to accomplish the various functions and operations of the present invention. Although in a preferred embodiment, the software application 100 was loaded onto the computer's hard drive 26, the software application 100 may be loaded onto or made available to the computer 20 in any of the manners as are currently know or to be developed for loading software onto or otherwise making software available for execution on a computer.

Upon initial activation or execution, the software application 100 created a software defined isolated operating environment (SOE) having its own memory and data storage allocations separate from the primary operating system of the computer 20. As more specifically illustrated in FIG. 4B, upon initial activation, the software application 100 caused allocation of a secondary memory partition 120 in the volatile memory (RAM) 28 of the computer 20, and similarly, an allocation of a secondary storage partition 116. Together, these allocations of memory 120 and data storage 116 and the instructions stored there configure the isolated operating environment as an isolation bubble in which to duplicate and run a secondary operating system (SOS) isolated within the bubble of the isolated operating environment, i.e., within the combined space of secondary memory 120 and secondary storage 116 allocations. In the preferred embodiment illustrated, the SOS was a WINDOWS® type operating system. However, in view of the disclosure herein, other operating systems are practicable with the present technology by one of ordinary skill in the art, depending on the operating platform of the computer 20 (i.e., Unix, Macintosh, etc.).

Figure 4B:
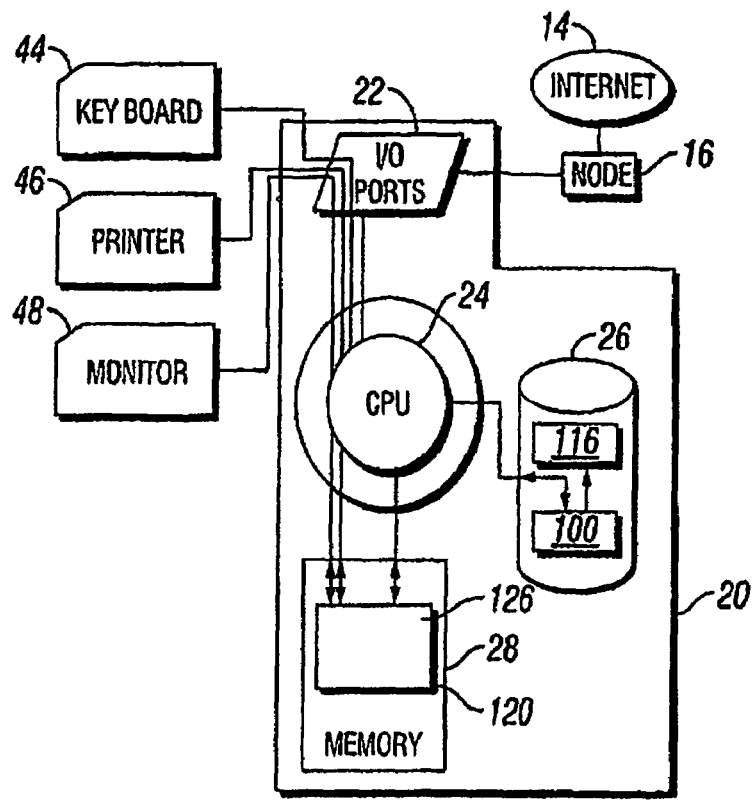
FIG. 4B is a block diagram of the present invention showing the interconnect scheme for certain internal components of a typical PC-type computer in upon initial execution of the software application, and illustrating establishment of the isolated operating environment and its memory and storage components.

As exemplified in FIG. 4B, upon activation of the master image file 100 of the present system 10, a secondary memory partition 120 representing the SOE is established in the volatile memory 28 of the computer 20 and a virtual drive (V-drive) or secondary data storage partition 116 is established in storage 26. In practicing this preferred embodiment, the SOS 126 was established in secondary memory or SOE partition 120 of RAM and the secondary data partition (V-drive) 116 on the hard drive storage 26. Although RAM has been used in practicing the present system, any similarly responsive and volatile memory controllable by the SOS 126 may be practicable in the present system 10. Likewise, the V-drive 116 may be accomplished by alternative means as well, such as by having or being its own storage medium.

Activation of the master image file 100 causes the establishment of the V-drive 116 and the secondary operating environment 126, and puts the computer 20 into a "pre-online" condition. In this condition, the computer 20 is not yet connected to the Internet 14, but the V-drive 116 and the SOE 120 (loaded with the SOS applications) via which the Internet 14 is to interact have been established. The SOS 126 includes an operating system and other software applications, such as a browser, as are selectable by one of skill in the art for practice in the SOS 126. A visual representation of the SOS 126 in the SOE 120 is communicated via a video signal through the CPU 24 for display on the monitor 48.

The SOS 126 loaded into the secondary operating environment 120 in the preferred embodiment illustrated included a complete duplicate of the primary operating system of the real computer, reconstructed in the SOE 120 in cooperation with the secondary data partition (V-drive) 116. Although the preferred embodiment exemplified was practiced using a complete copy of the computer's operating system, it is anticipated that for efficiency reasons that only those features of the operating system and those ancillary software applications that are necessary to run a browser application might be loaded in the SOE 120.

The master image file application 100 includes all of the software defined features necessary to accomplish establishing the V-drive 116 in storage 26, the SOE 120 in volatile memory 28, and to load and isolate a secondary or virtual operating system 126 within the SOE 120. The unexpected benefit of this action was the resultant similar isolation of a browser application operating under control of the SOS 126 in the secondary operating environment 120. By having the virtual SOS with its browser functions isolated strictly to the SOE 120, the only signal communications between CPU 24 of the real computer (and primary operating system) 20 and the SOS 126 are control signals, such as video, audio and printer signals—which are directed to a peripheral device and not to the file structure of the user's computer 20. Therefore, even if the peripheral device signals did carry malicious code, the code does not pass from the peripheral device and cannot affect the file structure of the user's computer 20.

As shown in FIG. 4B, in the pre-online condition, a functioning connection (double-headed arrow) between the master image file application 100 and the CPU 24 is established. This results in the SOE 120 being established in memory 28 and SOS 126 being loaded/installed in the SOE 120. Additionally, this causes the establishment of a data storage partition (V-drive) 116 on the storage device 26, if one is not already present from a prior activation of the master image file 100. However, there is not yet a functioning connection between the CPU 24 and the Internet node 16. Once the V-drive 116 and the SOE 120 is established and the SOS 126 loaded the user can access the SOS 126 in a similar manner as he/she accesses the real/primary operating system of the computer 20 via key board/mouse devices 44 and the computer's monitor 48.

Figure 4C:
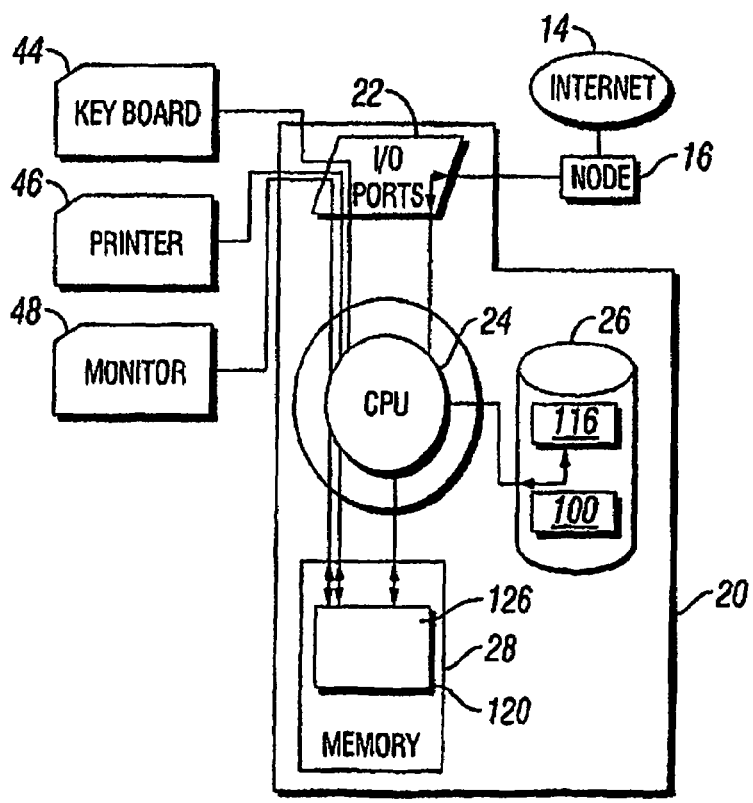
FIG. 4C is a block diagram of the present invention showing the interconnect scheme for certain internal components of system's computer in a state upon establishment of a connection of the computer to the Internet, including the Secondary Operating Environment in the volatile memory of the computer.

Once the computer 20 is in the pre-online condition, a user accesses the Internet 14 via a SOS 126 from the isolation of the SOE 120, to put the computer 20 into an "online" condition. In the online condition, as exemplified in FIG. 4C, the master image application software 100 has completed it primary function and is substantially no longer directly connected to the CPU 24. However, communication is established between the computer 20 and the Internet node 16 as exemplified by a connection (double-headed arrow) through the I/O ports 22. One or more SOS applications 126, such as a browser and a communications protocol, are used to establish the connection and enable the computer 20 to communicate with the Internet 14. The Internet may now be accessed via the SOS 126 within the isolation of the SOE 120.

Figure 5:
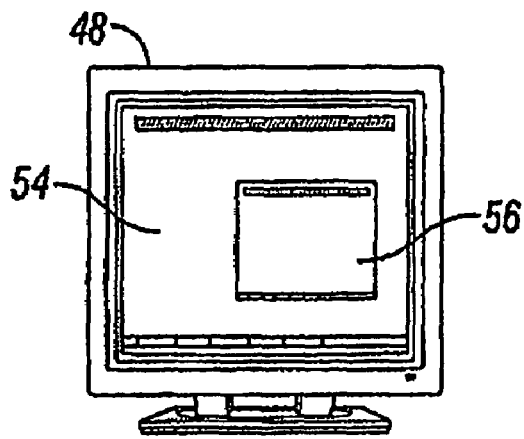
FIG. 5 shows a computer monitor with operating system overlays displayed stacked on the monitor screen.

A video representation of the SOS 126 running in the SOE 120 is displayed on the monitor 48 as a SOS desktop video overlay 56 stacked on the primary OS video display 54, see FIG. 5. The SOS 126 running in the SOE 120 is controlled from the SOS video overlay 56.

Table I is a general outline of the present inventive software's requirements. Table II is a detailed outline of the present inventive software's requirements, sufficient in combination with the other teachings and figures set forth herein, to allow one of ordinary skill in the art to practice the present invention. Additionally, the ordinary skilled artisan will appreciate in view of these teachings that the order in which the requirements are set forth and their grouping are subject to modification without departing from the scope of the present as described and claimed herein.

TABLE 1

Software General Requirements Outline

1 Required States and Modes
   1.1 Installation State
   1.2 Startup State
      1.2.1 Initializing/Establishing the Secondary Operating Environment
      1.2.2 Startup of Secondary Operating System
   1.3 Operational Modes
      1.3.1 Normal Mode Operation
      1.3.2 Safe Mode Operation
      1.3.3 Abnormal Mode Operation: Error conditions causing shutdown
   1.4 Shutdown
      1.4.1 Shutdown of Secondary Operating System
      1.4.2 Shutdown of Secondary Operating Environment
2 Secondary operating environment (SOE) Requirements
   2.1 Set Secondary Operating Environment Conditions
      2.1.1 Allocate a region of memory (RAM) for the SOS
      2.1.2 Open a connection to the CPU
      2.1.3 Open a connection to the external data source (Internet)
      2.1.4 Open connections to data storage device (hard drive)
      2.1.5 Open a connection to the video card
      2.1.6 Open a connection to the sound card
      2.1.7 Open a connection to the printer
      2.1.8 Open a connection to the keyboard
      2.1.9 Open a connection to the mouse
   2.2 Form Network Bridge Between the POS and SOS
   2.3 Set Intranet Access Permissions TABLE 1-continued Software General Requirements Outline 2.4 Set Internet Access Permissions
2.5 Set File Access Permissions
2.6 Set File Sharing
3 Secondary Operating System (SOS) System Specifications
  3.1 Execute Secondary Operating System (SOS) Platform Application
  3.2 Install SOS
    3.2.1 Check Pre-Installation conditions
      3.2.1.1 Check for POS compatibility
      3.2.1.2 Check for processor compatibility
      3.2.1.3 Check for sufficient memory (RAM)
      3.2.1.4 Check for sufficient data storage (hard disk) space
      3.2.1.5 Check for external data source (Internet) connection
    3.2.2 Check and Set Partitions
      3.2.2.1 Create SOS temporary data storage partition
      3.2.2.2 Create SOS User Save data storage partition
      3.2.2.3 Copy SOS application files
      3.2.2.4 Update POS files
    3.2.3 Set Permissions
      3.2.3.1 Update program registry entries
      3.2.3.2 Set Intranet permissions
      3.2.3.3 Set Internet permissions
    3.2.4 Decrypt and install files
    3.2.5 Activate the software
    3.2.6 Establish Shortcuts (optional)
    3.2.7 E-Register (optional)
  3.3 Startup/Initialize the SOS
    3.3.1 Create a fresh copy of SOS Image File
    3.3.2 Allocate Memory (RAM) to SOS
    3.3.3 Load SOS into Memory
    3.3.4 Establish connection with Data Storage (hard drive) partition
      3.3.4.1 Link SOS to Temporary Data Storage Partition
      3.3.4.2 Link SOS to User-Save Data Storage Partition
      3.3.4.3 Read-Only Link SOS to POS
    3.3.5 Suspend Intranet Access and Activity
    3.3.6 Establish an External Data Source (Internet) Connection
  3.4 Run the SOS
    3.4.1 Safe Mode Operation
      3.4.1.1 Master File Up-Date/Modification
      3.4.1.2 Allow Restricted Access to the POS
    3.4.2 Normal Mode Operation
      3.4.2.1 Open Internet access interface
      3.4.2.2 Establish access to the User Save data storage partition
      3.4.2.3 Write user saved data/files to the User Save partition
      3.4.2.4 Establish access to the Temporary data storage partition
      3.4.2.5 Write temporary data/files to Temporary data storage partition
      3.4.2.6 Maximum limit of access to the POS partitions
4 Termination SOS Operations and Closing of SOE
  4.1 Abnormal Termination of SOS (Error Conditions)
  4.2 Normal Termination SOS Operations and Closing of SOE
    4.2.1 Disconnect from the Internet
      4.2.1.1 Close the Internet Interface
    4.2.2 Disconnect from the SOS partitions
      4.2.2.1 Disconnect from SOS temporary Data Storage partition
      4.2.2.2 Disconnect from the User Save data storage partition
      4.2.2.3 Free memory (RAM) allocated to SOS
      4.2.2.4 Suspend the SOS boot partition
    4.2.3 Restore Intranet connection to the POS
5 SOE & SOS Uninstall Component (optional)

TABLE II

Software Requirements Specification for
the Secondary Operating Environment and System (SOS)

General Requirements
The general requirements are divided into sections identifying more requirements
for the secondary operating environment (SOE) and the secondary operating system
(SOS) of the present inventive technology. Note: Where the requirements indicate OSA,
it is intended that one of ordinary skill in the art make the selection of how the specifics
of a general requirement be practiced when embodying the present inventive software
technology.
1 Required States and Modes
The software generally embody the following functional states: Installation, Start-
up, Normal Operations, Safe Operation, Normal Shutdown, and Abnormal Shutdown.
Installation state refers to the condition in which the software application is
installed or resident on the computer, but the primary files, registry and data of the
computer are not affected by the presence of the installed software.
Start Up state refers to the condition in which the software application resident
on the computer is first activated or activated from the installation state. In this
state the secondary operating environment is established and the SOS and
associated applications are loaded into the secondary operating environment.
Normal Operation state refers to the condition in which the software application
has executed and completed the Start up state. In this state an active
communication session with an external data source, such as the Internet is
initiated and sustained.
Normal Shutdown state refers to the condition in which the active
communication session is terminated and the and the present inventive software
technology returns to the Installation state or to the Start Up state.
Abnormal Shutdown state refers to a default state which the software enters
upon an abnormal functional or operational occurrence in the execution of the
software or other error condition of the operation of the SOS or associated
application as one of skill in the art selects as requiring entry of the software
operation into the Abnormal Shutdown state. The result of entry into the TABLE II-continued Software Requirements Specification for
the Secondary Operating Environment and System (SOS)

Abnormal Shutdown state can be that the present inventive software technology
returns to the Installation state or to the Start Up state, depending on the nature
of the error or fault condition causing Abnormal Shutdown state.
1.1 Installation State
In the Installation state, the master file of the present inventive software is written
to a data storage device (e.g., hard drive) of the computer. During installation, the master
file of the software application (i.e., all but the install files) is copied to the data storage
device. Also during installation an initial check is made to confirm the computer meets
the minimum system requirements of the present software application, and that complete
installation of all component files of the software application has been successful
accomplished.
In the installation state or mode, the present software application shall check the
Primary Operating System for compatibility of RAM, data storage space, operating
system version, and other conditions as necessary. If any condition is not met, the user
shall notified, and the installation files cleaned up, and the installation aborted. The
software application sets the permissions and registry entries of both the primary operating
system and the secondary operating environment/SOS as required to prohibit connection
to the external data source (Internet) via the primary operating system. Preferably, the
present software application places a shortcut (icon) to the SOS on the desktop of the
primary operating system.
Optionally, the software shall register its installation, and Additional installation
state options include the present software application checking for previous installations,
validating the CD-ROM key of a current installation, and e-registering the software.
1.2 Startup State
In the Start up State the secondary operating environment bubble is established
and the SOS and associated applications and files are loaded into it.
1.2.1 Initializing/Establishing the Secondary Operating Environment
During initialization, the secondary operating environment (SOE) is established
by the allocation of memory and storage space, any setting of permissions to form the
SOE bubble in isolation from the primary operating system. The SOE provides an
isolated intermediate environment (bubble) located above the primary operating system
in which the SOS resides. The secondary operating environment must be fully established
before the SOS can be activated.
1.2.2 Startup of Secondary Operating System
A copy of the master image is placed within the SOE. The copy of the master
image is executed to establish the SOS within the SOE.
1.3 Operational Modes
It is preferred that the operating system utilized for the SOS be capable of running
in two operational modes: a normal operations mode and a safe operations mode.
Examples of such operating systems adaptable by the ordinary skilled artisan for practice
in the present invention include various of the Microsoft WINDOWS ® operating system
products, particularly WINDOWS 98 ® and later. Both modes will run within the
secondary operating environment bubble.
1.3.1 Normal Mode Operation
In the Normal Mode Operation, the user shall have read-only access to files
located on the POS. The connection to the Internet will be operational. All files
downloaded from the Internet will be stored in SOS partitions.
1.3.2 Safe Mode Operation
Safe Operation Mode generally will have the functionality the safe mode feature
of a typical off-the-shelf operating system product. However, the typical off-the-shelf
operating system product and the secondary operating environment is modified as
necessary to provide:
that access (particularly read or receive access) to selected or all external data
sources is prohibited in Safe Mode; and
that a user does have access (e.g., read only) to selected files stored (e.g., on the
hard drive) in the primary operating system.
This mode can be used to transfer or load a desirable ancillary application from the
primary operating system to the secondary operating environment for access by the SOS -
under read only access. This access can be extended to allow modification of a section
or sub-file of the master software application in storage to include the desirable ancillary
application in future activation of the secondary operating environment and SOS.
Optionally, with the proper permissions set by the secondary operating environment and
SOS, this mode can be used to transfer (write) selected files from the SOS to the primary
operating system, e.g., file types which cannot contain malicious code.
to be included in the SOS transfer files from the SOS partitions to the POS hard drive. In
this mode, there will not be an Internet connection.
1.3.3 Abnormal Mode Operation: Error conditions causing shutdown
No capability to intercept and act upon abnormal conditions shall be provided
beyond those supplied with the selected off-the shelf software.
1.4 Shutdown
1.4.1 Shutdown of Secondary Operating System
Upon command from user, the SOS shall shut down and close all associated
applications running under control of the SOS. All hardware connections opened by the
SOS shall be closed.

TABLE II-continued

Software Requirements Specification for
the Secondary Operating Environment and System (SOS)

1.4.2 Shutdown of Secondary Operating Environment
Upon shutdown of the SOS, the SOE shall stop operations, close all windows, and
terminate any external SOE connections.
2 Secondary Operating Environment (SOE) Requirements
The SOE provides a communications bridge between the primary operating system
and the SOS. It also provides a second operating environment (or bubble) substantially
independent of the primary operating system in which to run the SOS. The secondary
operating environment provides the bubble environment in which to run a SOS, such as
a WINDOWS operating system including CE, BOCHS, or other operating system adapted
or created for operation within the secondary operating environment bubble.
2.1 Set Secondary Operating Environment Conditions
Running the secondary operating environment related software or portion of the
master file creates and sets the secondary operating environment. The SOE provides a
substantially separate environment "bubble" isolated within the primary operating
environment, within which there is the capability to load and run a separate, stand-alone
operating system - the SOS. Standard interfaces or emulators are utilized to facilitate the
communications bridge between the primary operating environment and the SOS, to
provide the SOS with necessary input and output capabilities.
2.1.1 Allocate a region of memory (RAM) for the SOS
Execution of the SOE code causes an allocation of memory (RAM partition) as
the bubble environment sufficient to operate the SOS. The RAM partition size must be
sufficient to operate the SOS and the running all applications associated with the SOS.
2.1.2 Open a connection to the CPU
Depending on the SOE environment selected, the CPU must either be emulated
or a connection to the POS CPU must be made.
2.1.3 Open a connection to the external data source (Internet)
The SOS shall accept a DCHP from the Internet server or from the router.
2.1.4 Open connection to data storage device (hard drive)
A minimum of TBD available disk space shall be available for the installation and
operation of the SOE. This requirement is a function of the SOE selected and
implemented. Sufficient disk space must be available to store the operating system,
temporary and user-saved files. These files are to be located in partitions defined by the
SOS software.
Four hard drive partitions shall be opened:
1. SOS Image File partition in read-only mode.
2. SOS User Save partition in read-write-mode.
3. SOS Temporary partition in read-write mode.
4. POS partition in read-only mode.
2.1.5 Open a connection to the video card
The video card shall be assumed to be SVGA, 256 colors, 640 × 480 or 800 × 600.
Preferably, a standard SVGA driver for the video shall be emulated. As will be
appreciated by the ordinary skilled artisan, as the field develops, one of ordinary skill in
the art knows that other video cards or drivers may be practicable in the present invention.
2.1.6 Open a connection to the sound card
In a preferred embodiment, a generic sound driver is used to accept sound output
from applications within the SOS. The driver then routes the sound data to the POS,
where it is interpreted by the sound driver native to the POS. Other sound handling
options are available and selectable by the ordinary skilled artisan, such as passing the
sound data directly to the POS for interpretation.
2.1.7 Open a connection to the printer
All output destined for the printer shall be transferred to the POS as a print job
(format TBD - could be RAW or ASCII text).
2.1.8 Open a connection to the keyboard
Standard keyboard input shall be allowed when the SOS is the active window in
the POS.
2.1.9 Open a connection to the mouse
Standard mouse input shall be allowed when the SOS is the active window in the
POS.
2.2 Form Network Bridge Between the POS and SOS
A network bridge is formed between the SOS and the POS, with the SOS being
assigned a default IP address.
2.3 Set Intranet Access Permissions
User has access limited to the default gateway from within the SOE. Additionally,
the POS is blocked from initiating or receiving Intranet activity, except to pass data to and
from the SOS, as long as the SOS is active.
2.4 Set Internet Access Permissions
User shall have full access to the Internet from the SOE. Information received
from the Internet shall be stored in the User Save partition and in the temporary partition.
All incoming data is routed to the SOS - regardless of IP address, and all out
going data is routed to the default gateway - regardless of IP address.
2.5 Set File Access Permissions
Users shall have full access to files downloaded from the Internet from within the
SOS.

TABLE II-continued

Software Requirements Specification for
the Secondary Operating Environment and System (SOS)

Users shall have access to files stored in the POS. Read-only access shall be
allowed. No write access shall be allowed.
2.6 Set File Sharing
The SOS shall have the capability of exporting files stored on the User Save
partition to the POS. Files shall be exported in such a way as to minimize the introduction
of malicious code into the POS environment.. Files could be filtered based on file
extensions or reformatted to an innocuous version of the data type to prevent the
introduction of malicious code to the POS partition.
3 Secondary Operating System (SOS) System Specifications
The SOS is the portion of the software visible to the user. This layer provides the
operating system which will be used to access the internet. The SOS resides in a layer
within the SOE and above and independent of the POS.
3.1 Execute Secondary Operating System (SOS) Platform Application
In a preferred embodiment, the operating system utilized by the SOS is
commercially available and off the shelf. Examples of operating systems that have been
successfully practiced with the SOS include: Windows 98, Windows CE, Windows XP
and Linix.
The master copy of the SOS operating files shall reside on the POS. The Master
copy of the SOS shall be protected from changes when the SOS is running in Normal
Mode. A minimum disk space of 200 megabytes (this may be changed based on the SOS
operating system selected) shall be available in the POS for the SOS master copy. A
minimum disk space of 200 megabytes (this may be changed based on the SOS operating
system selected) shall be available in the SOE for the operational copy of the SOS after
decryption.
The operational copy of the SOS shall be a copy of the master copy of the SOS
as it exists in the POS.
3.2 Install SOS
The SOS software image shall be delivered to the user as a preinstalled image. The
SOS Installation Component shall copy the operational copy of the SOS from the master
copy of the SOS in the POS. The SOS shall be installed in the Secondary operating
environment (SOE).
The SOS Installation Component shall set permissions for the Primary OS/Registry
as follows TBD based on SOS selected. Typical setting would be network permissions,
DLL registrations, etc.
The Installation Component of the SOS shall create three partitions for use by the
operational SOS. These partitions shall be: SOS Image Partition, User Save Partition, and
Temporary Partition. The POS and all of its components and files in read-only mode are
considered as a fourth partition by the SOS.
The Installation Component of the SOS shall save all error messages and log files
within the User Save partition of the SOS.
The SOS Installation Component shall create icon files for use of the operational
SOS. There shall be two icons: one for Safe mode and a second for Normal mode.
If necessary, the Installation Component of the SOS shall allow for reboot of the
POS to complete installation and to provide settings necessary for the proper operation
of the SOS.
3.2.1 Check Pre-Installation Conditions
Installation conditions shall be verified before the SOS can be installed. If an
installation requirement is not met, the user shall be notified, and the installation shall be
aborted.
3.2.1.1 Check for POS compatibility
Check POS for compatibility with the SOS operating in the SOE.
3.2.1.2 Check for processor compatibility
The installation program shall check for minimum processor type. The processor
shall be at a minimum a Pentium 3 or equivalent. On ERROR the installation program
shall notify the user of the error and abort the installation.
3.2.1.3 Check for sufficient memory (RAM)
The installation program shall check for sufficient RAM. The minimum RAM
requirement for installation is about 64 megabytes, or other amount as is selectable by the
ordinary skilled artisan. On ERROR the installation program shall notify the user of the
error and abort the installation.
3.2.1.4 Check for sufficient data storage (hard disk) space
The installation program shall check for sufficient free hard drive space. Minimum
hard drive space (TBD depending upon the SOS operating system selected). Minimum
partition size shall be sufficient to contain the SOS partition, the User Save partition, and
the Temporary partition. Additional space must be available to allow growth of the User
Save and the Temporary partitions. On ERROR the installation program shall notify the
user of the error and abort the installation.
3.2.1.5 Check for external data source (Internet) connection
Standard internet connections shall be allowed. This can be either a dial-up or
network connection. If the Internet connection is networked-based, the default IP address
determined during installation is used. If the user connects to the internet on a dial-up
connection, the software shall accept the setting from the default dial-up networking
settings in the POS. On ERROR the installation program shall notify the user of the error
and abort the installation.

TABLE II-continued

Software Requirements Specification for
the Secondary Operating Environment and System (SOS)

3.2.2 Check and Set Partitions
3.2.2.1 Create SOS Temporary data storage partition
This shall be a file residing on the POS hard drive. When you first turn on the
SOS, the temporary partition shall be only large enough to contain the internal file
allocation table. The file should be scalable to accommodate additional files. This partition
shall be deleted when the SOS is terminated. It shall be replaced with a fresh copy of the
blank temporary partition at each start-up of the SOS.
3.2.2.2 Create SOS User Save data storage partition
This is a file that resides on the POS hard drive. The file is scalable to
accommodate additional files and/or the deletion of existing files.
3.2.2.3 Copy SOS application files
The installation program copies the SOS operating system files to the POS
partition on the hard drive to a folder designated by the user. The installation program
suggest a default path and filename for these files. The user shall be able to modify the
default path.
3.2.2.4 Update POS files
The permissions in the POS must be updated to facilitate SOS access and to define
user access to the Intranet, Internet, and files.
3.2.3 Set Permissions
3.2.3.1 Update program registry entries
DLLs, EXEs and software keys are entered into the POS registry and/or
initialization files.
3.2.3.2 Set Intranet permissions
The installation program shall set the users Intranet permissions. See Section
2.2.1, Intranet Access Perimssions.
3.2.3.3 Set Internet permissions
The installation program shall set the users Internet permissions. See Section
2.2.2, Internet Access Permissions.
3.2.4 Decrypt and install files
If the installation files are encrypted, they are decrypted during installation. A
preferred means of accomplishing this is to use the unique software CD Key provided to
the user.
3.2.5 Activate the software (optional)
Upon completion of installation and validation of the CD Key, the software
installation is completed. If necessary, an automatic reboot is initiated. Upon reboot (if
needed) the SOS software will automatically be activated via E-Register (see section
3.2.7).
3.2.6 Establish Shortcuts (optional)
As known to one of ordinary skill in the art, a menu item/logo can be created to
facilitate a user's initiation of and/or access to the present inventive software application.
3.2.7 E-Register (optional)
As known to one of ordinary skill in the art, a menu item/logo can be created to
facilitate a user's registration of the present inventive software application via the Internet.
3.3 Startup/Initialize the SOS
The SOS Startup code verifies availability of all necessary partitions. See Section
3.2.2.
The SOS Master copy shall be written to the SOS Image partition. The SOS shall
be activated from the SOS Image partition.
The User shall be logged into the SOS. Default SOS login provided with the SOS
selected shall be used.
The User Save partition is accessible by the SOS, and any user save setting are
imported into the SOS. A fresh, empty Temporary data partition is created upon SOS
activation.
If the SOS is activated in Normal mode, an Internet connection shall be established
using the default web browser and email programs provided by the selected SOS.
If the SOS is activated in Safe mode, no Internet connection shall be allowed.
3.3.1 Create a fresh copy of SOS Image File
This partition shall be deleted when the SOS is terminated. It shall be replaced
with a fresh copy of the SOS operating system partition at each start-up of the SOS.
3.3.2 Allocate Memory (RAM) to SOS
The available free RAM (See Section 2.1.1.1, Allocate region of memory (RAM)
for the SOS) shall be made available to the SOS.
3.3.3 Load SOS into Memory
A new copy of the SOS shall be created from the Master SOS Image folder.
3.3.4 Establish connection with Data Storage (hard drive) partition
Connections to the Hard Drive Partitions shall be made for use of the SOS.
3.3.4.1 Link SOS to Temporary Data Storage Partition
A new Temporary partition shall be created in read-write mode.
3.3.4.2 Link SOS to User-Save Data Storage Partition
A link to the User Save partition shall be established in read-write mode.
3.3.4.3 Read-Only Link SOS to POS
In normal mode, the POS data shall be made accessible in read-only mode.
3.3.5 Suspend Intranet Access and Activity
No Intranet activity (other than the default gateway) shall be allowed.

TABLE II-continued

Software Requirements Specification for the Secondary Operating Environment and System (SOS)

3.3.6 Establish an External Data Source (Internet) Connection
In normal mode, a connection to the Internet shall be opened, using the setting
determined at installation.
In safe mode, no Internet connection shall be allowed.
3.4 Run the SOS
The user is allowed to select one of two modes for operation of the SOS.
3.4.1 Safe Mode Operation
In safe mode, the user does not have access to the internet.
3.4.1.1 Master File Modification
The user shall be able to modify the SOS Master file. Allowed configuration
changes allowed would include selected wallpaper, backgrounds, color schemes, screen
savers, screen resolution and color depth.
User-allowed modifications shall be written to the Master SOS File.
3.4.1.2 Allow Restricted Access to the POS
The user is able to access any non-SOS files on the POS hard drive. Userhas the
option to move files from the SOS User Save partition to folders on the POS Hard Drive.
The user is warned of possible infection of the files and potential corruption of the POS.
Note: On user initiated exports, post warning, such as: Ask User, Deny, Allow or Warn.
A table of file extensions and appropriate actions is checked before allowing export of a
file across the network bridge to the POS.
3.4.2 Normal Mode Operation
The user has full access to the Internet when the SOS is running in Normal Mode.
3.4.2.1 Open Internet access interface
On start-up, the connection to the Internet is opened using parameters obtained
during installation.
3.4.2.2 Establish access to the User Save data storage partition
The User Save partition is opened with full read-write access.
3.4.2.3 Write all user saved data to the User Save partition
Any data explicitly downloaded from the Internet is saved in the User Save
partition.
3.4.2.4 Establish access to the Temporary data storage partition
The SOS Temporary Data partition is opened with full read-write access.
3.4.2.5 Write temporary files to the Temporary data storage partition
Any working data or files is stored on the SOS Temporary Data partition.
3.4.2.6 Maximum limit of access to the POS partitions
The user is allowed to access any POS Hard Drive Partitions (files and folders) not
explicitly for the use of the SOS in read-only mode. Access permissions shall be set in the
SOS so that the POS permissions are unchanged.
4 Termination SOS Operations and Closing of SOE
4.1 Abnormal Termination of SOS and/or SOE (Error Conditions)
No additional error processing is provided beyond that of the selected POS, SOE
and SOS. The SOS Master file and the SOS Temporary partition are always be
overwritten at start-up, so that no special processing is need from clean-up on abnormal
termination.
4.2 Normal Termination SOS Operations and Closing of SOE
4.2.1 Disconnect from the Internet
The connection to the Internet is terminated.
4.2.1.1 Close the Internet Interface
All programs used to access the Internet (browser, email, etc.) shall be shut down.
4.2.2 Disconnect from the SOS partitions
4.2.2.1 Disconnect from the SOS temporary Data Storage partition
The SOS temporary Data Storage partition is deleted.
4.2.2.2 Disconnect from the User Save data storage partition
Any open User Save files are save to the User Save partition, and the User Save
partition is closed.
4.2.2.3 Free memory RAM allocated to SOS
RAM assigned to the SOS shall be released.
4.2.2.4 Suspend the SOS boot partition
The SOS Boot file is closed. Note that this partition is overwritten at the next
activation of the SOS.
4.2.3 Restore Intranet connection to the POS
The POS connection to the Intranet is restored to normal operations.
5 SOE & SOS Uninstall Component
Uninstalling the SOE & SOS, all associated programs, files, menu items, and
shortcuts that were uniquely installed for the SOS can be deleted from the primary
operating environment and POS in any of a number of manners known to one of ordinary
skill in the art.

FIGS. 8A to 8G are block diagrams illustrating various sections of the software requirements set forth above in Table II.

Figure 6A:
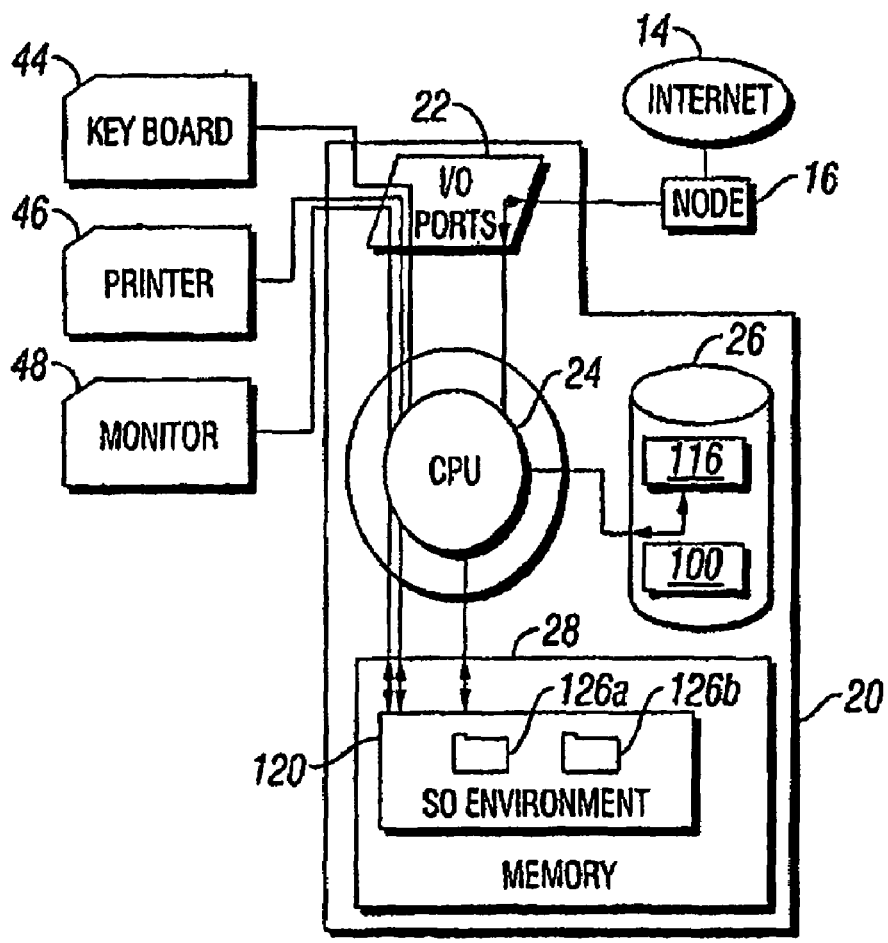
FIG. 6A is a block diagram of the present invention showing the computer in a state of connectivity with the Internet and that the location of any files downloaded from the internet (infected or otherwise) is isolated to the virtual operating system environment in the volatile memory of the computer.
Figure 6B:
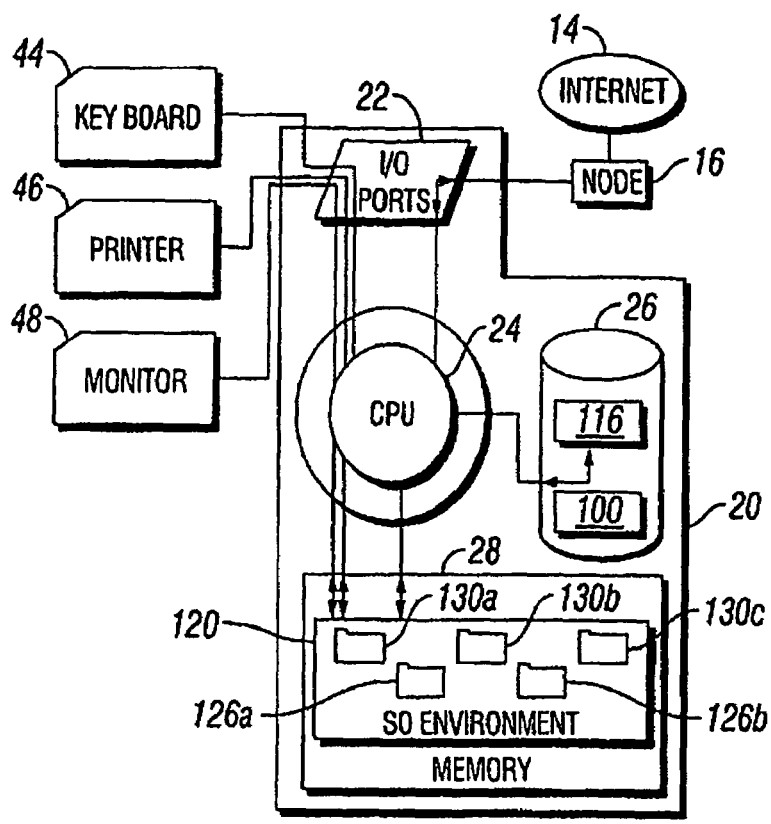
FIG. 6B is a block diagram of the present invention showing the computer in a state of connectivity with the Internet and that locus of action or influence of any malicious files downloaded from the internet is isolated to the virtual operating system environment contained in the volatile memory of the computer.

As exemplified in FIG. 6A, once the online condition is established, safe access to the Internet was accomplished by running one or more applications 126a & 126b of the SOS 126 in the isolation of the SOE 120. During a SOE 120 isolated Internet session, external data files 130a-c were downloaded by from the Internet 14 into the memory of the SOE 120 as exemplified in FIG. 6B. Note that the downloaded files 130a-c accessed during the Internet session only exist in the memory partition of the SOE 120. The downloaded Internet files 130a-c never exist on the computer 20 outside of either the volatile memory of the SOE 120 or the SOS data partition 116.

Figure 6C:
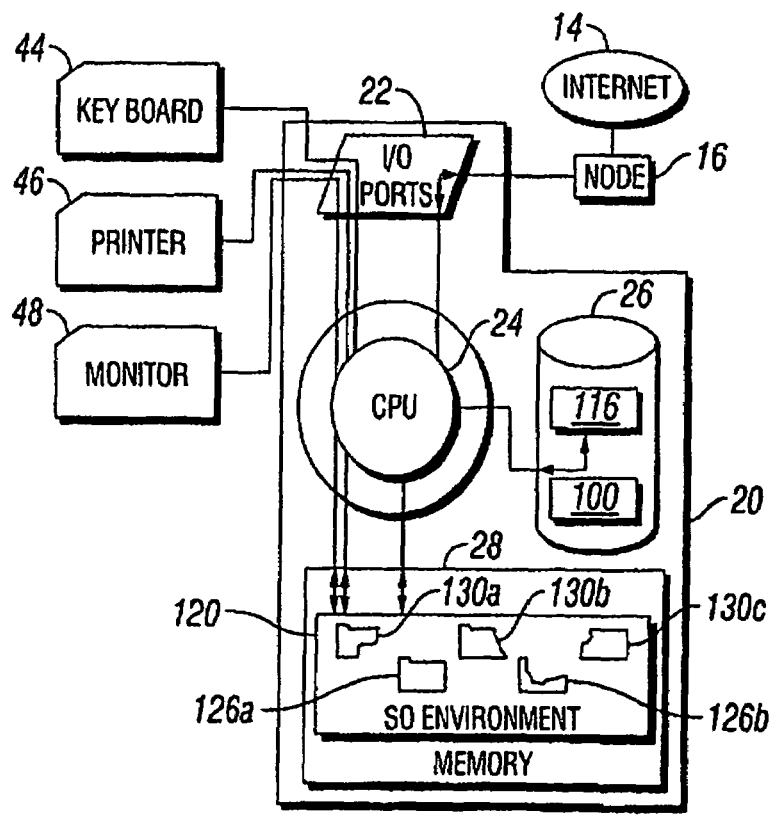
FIG. 6C is a block diagram of the present invention showing the computer in a state of connectivity with the Internet and that upon activation of the "purge" function of the present invention, the compromised virtual operating system environment is purged from volatile memory (RAM) and a fresh virtual operating system environment is established from the template/instructions in storage
Figure 7:
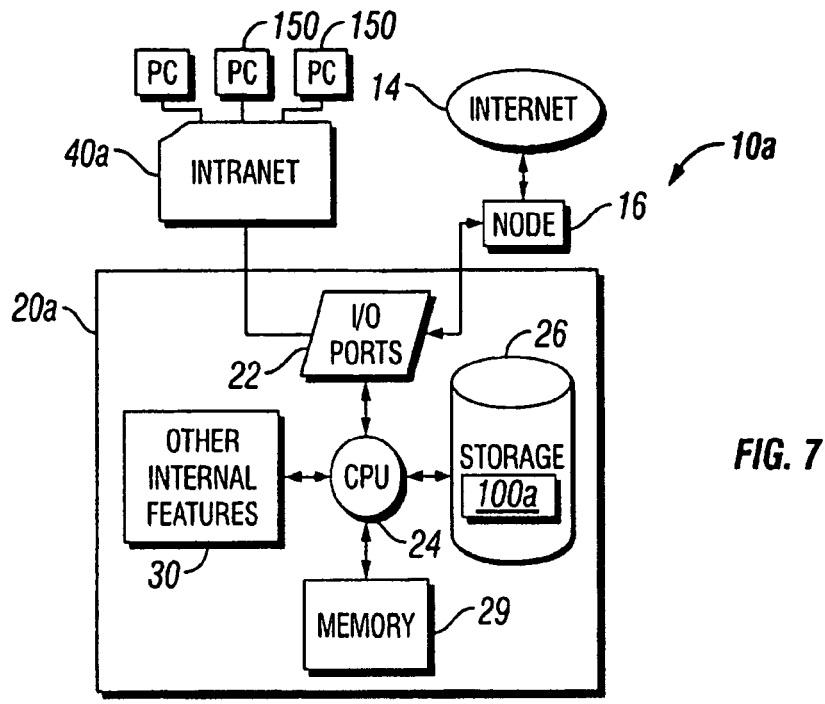
FIG. 7 is a block diagram of the present invention showing the interconnect scheme for certain internal components of system configured as an Intranet interfaces with the Internet, with the system computer being an Internet server computer for the Intranet.
Figure 8A:
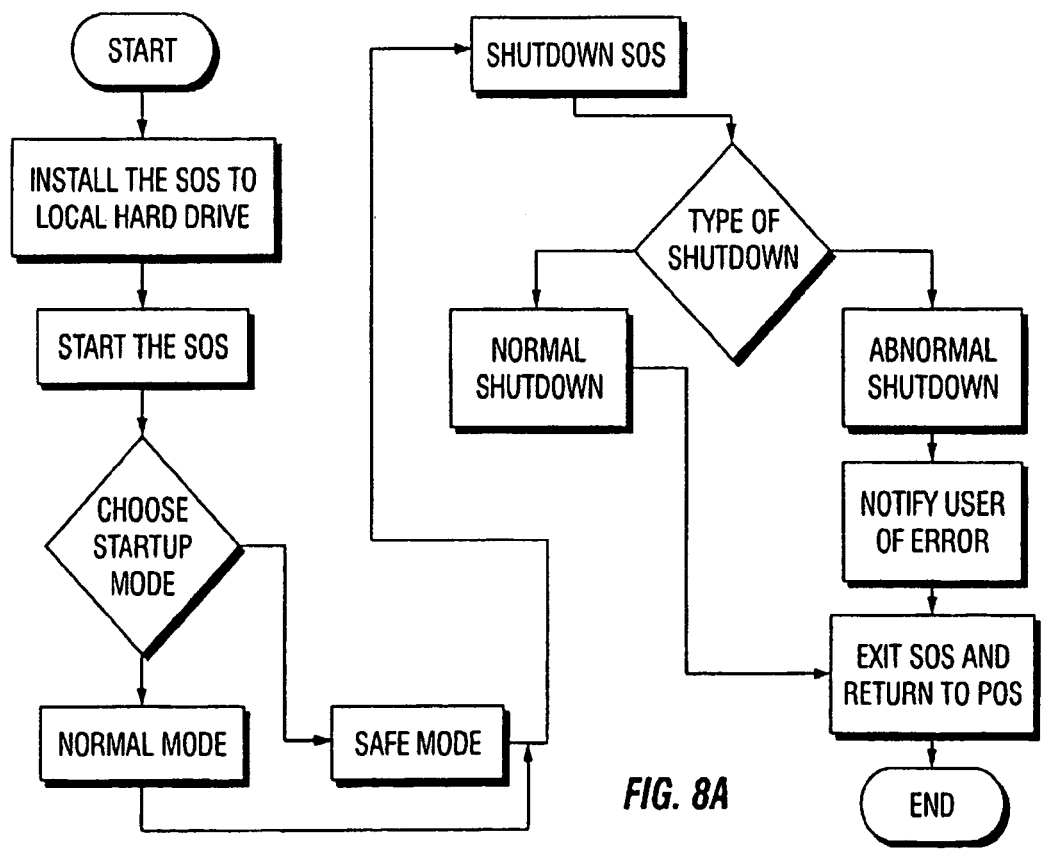
FIGS. 8A to 8G are block diagrams illustrating various sections of the software requirements of Table II.
Figure 8B:
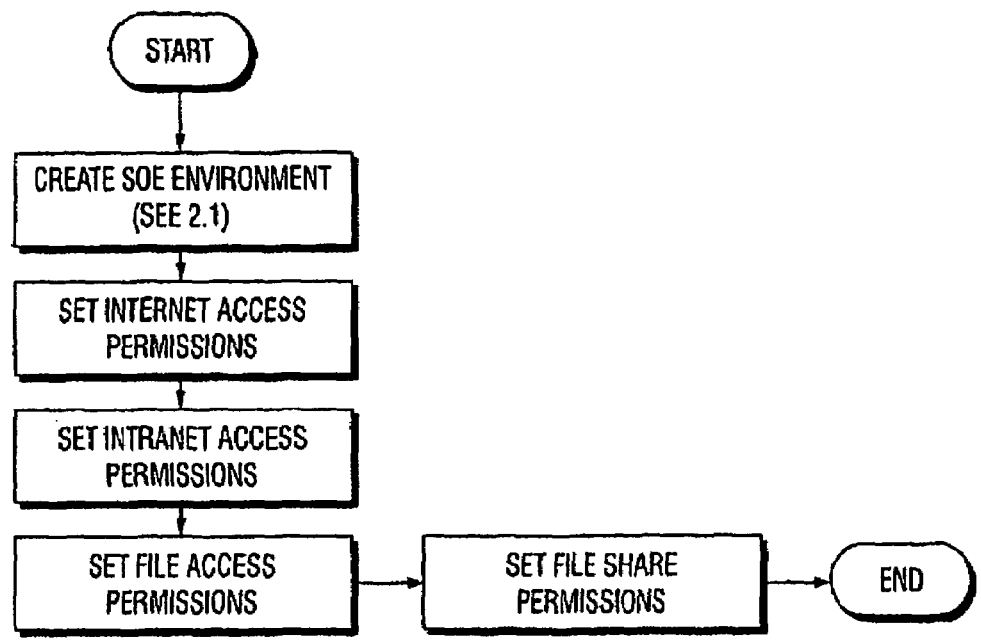
Figure 8C:
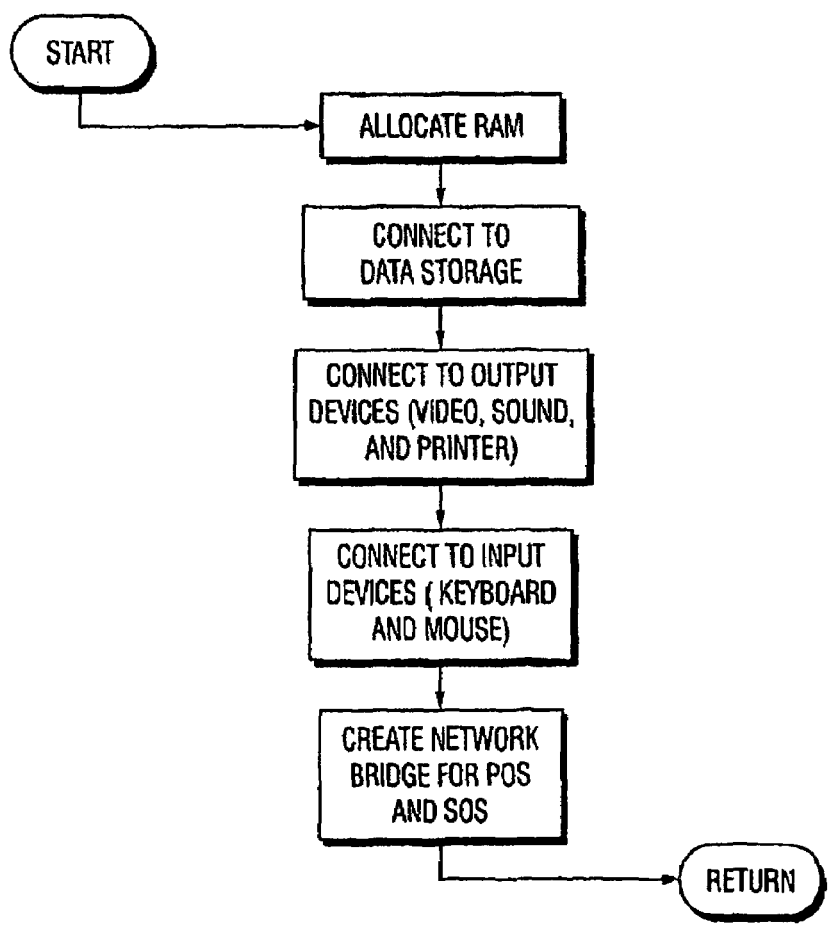
Figure 8D:
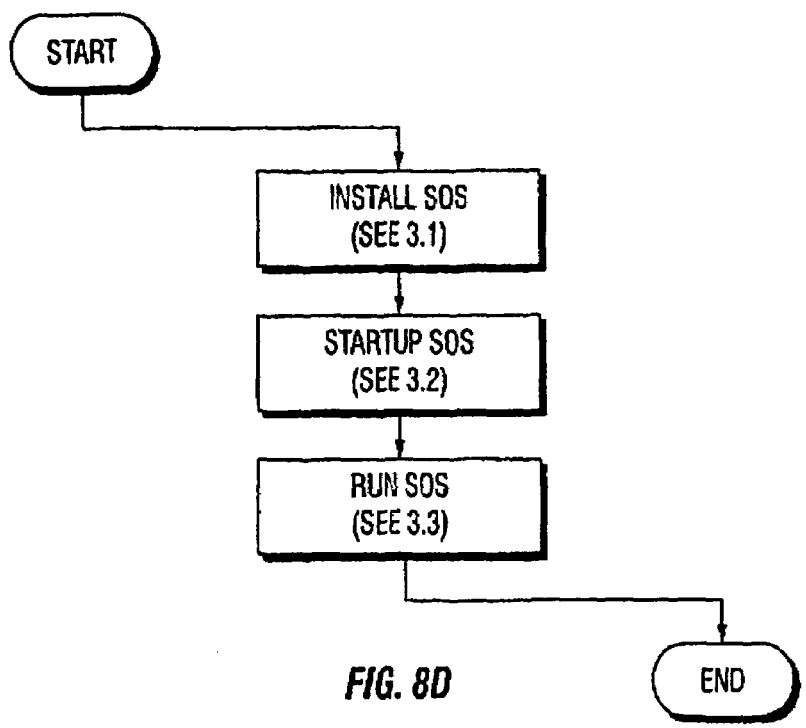
Figure 8E:
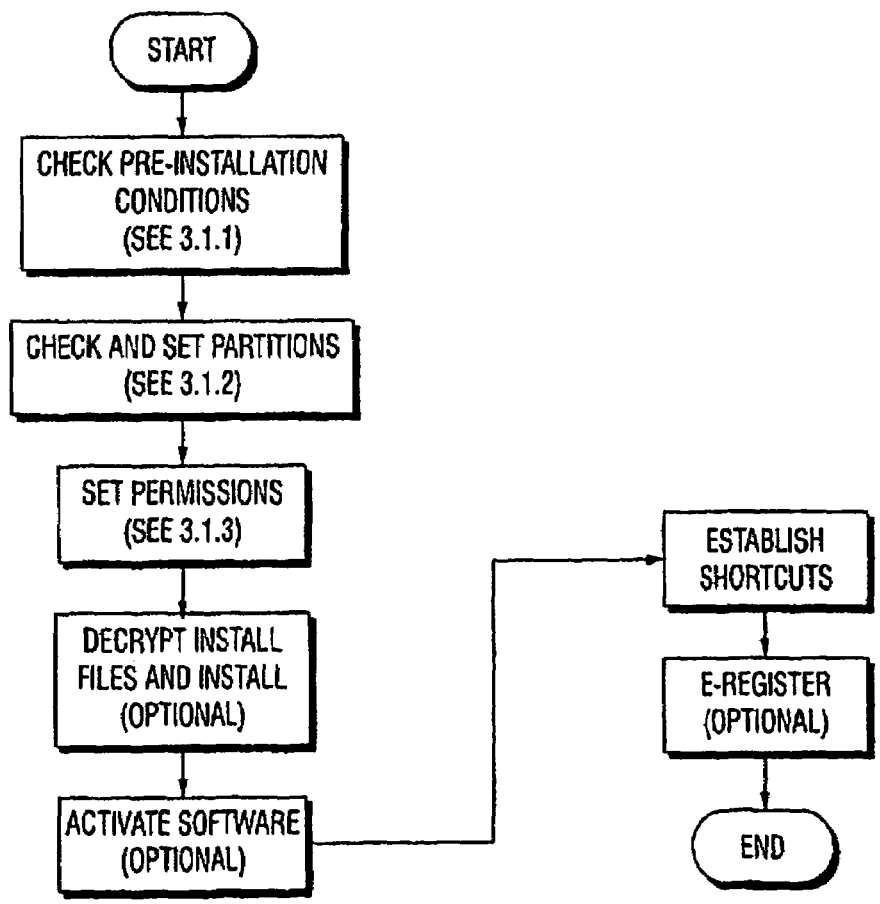
Figure 8F:
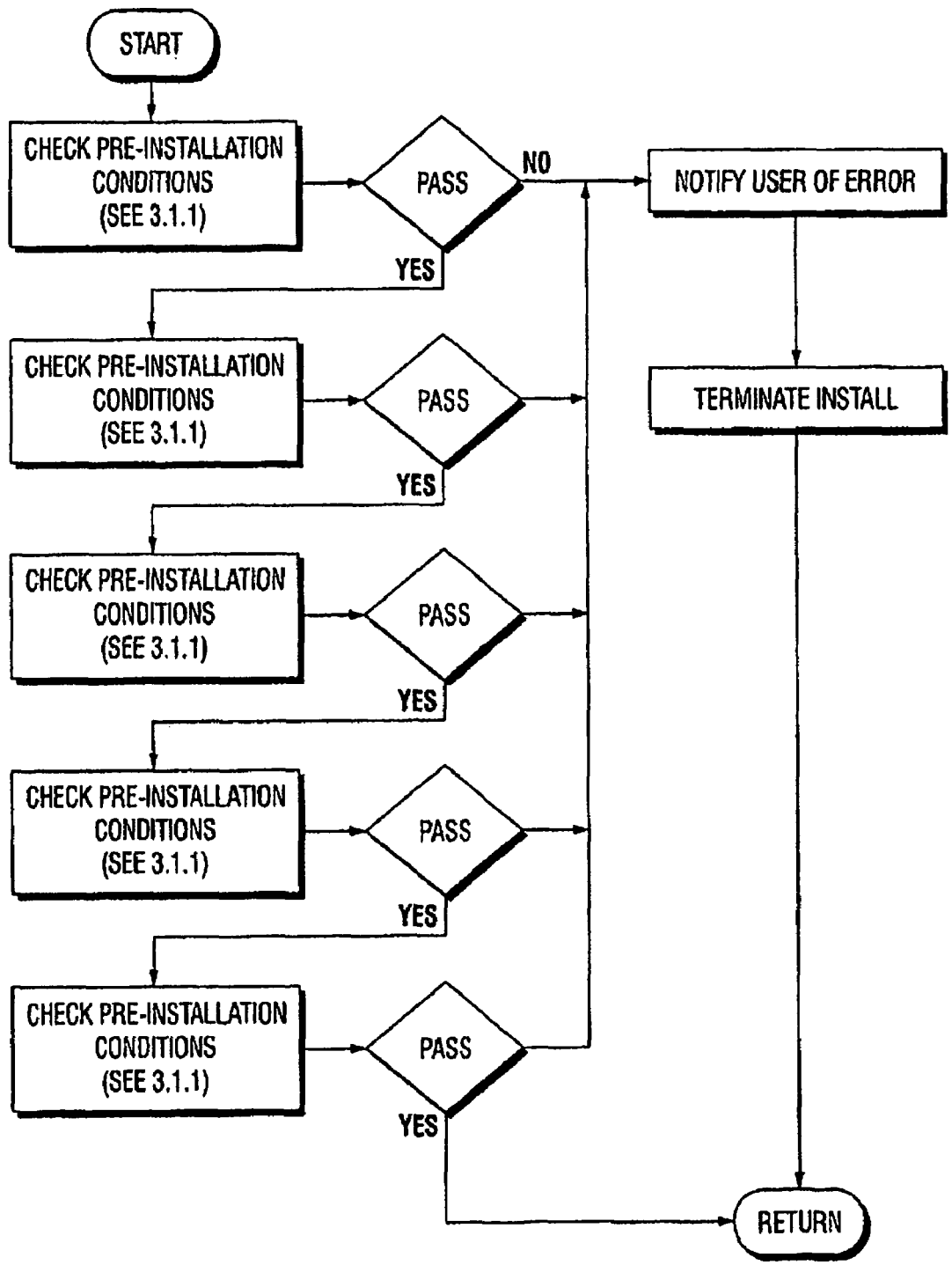
Figure 8G:
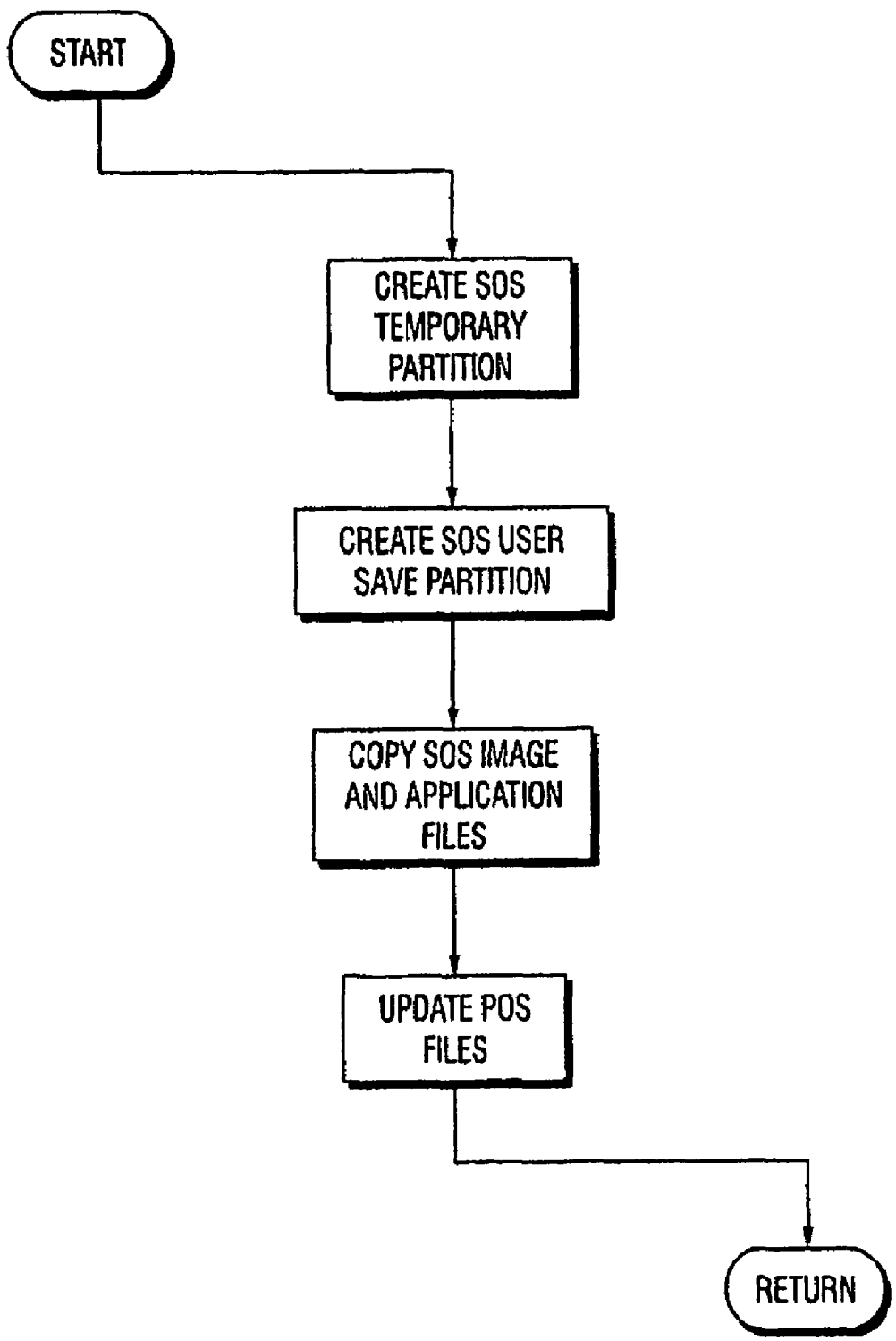

If any of the downloaded files 130a-c contain malicious code (e.g., viruses, worms, trojans, etc.), the only environment in which they can operate is within the SOS 126 in of the SOE 120 or within the isolation of the secondary data partition 116. Therefore, as exemplified in FIG. 6C, the only files that can be affected by the malicious code are limited to those files in the SOE 120. So, even if SOS files 126a & 126b become corrupted, including the files in the SOS data partition 116, these corrupted file only exist or can only be opened in or from the SOE 120 by the SOS 126. Consequently, no file on the real computer 20 outside of the SOE 120 can become corrupted.

While the above description contains many specifics, these should not be construed as limitations on the scope of the invention, but rather as exemplifications of one or another preferred embodiment thereof. Many other variations are possible, which would be obvious to one skilled in the art. Accordingly, the scope of the invention should be determined by the scope of the appended claims and their equivalents, and not just by the embodiments.

What is claimed is:

1. A software application stored as a computer program encoded onto memory installable on a personal computer, wherein the computer program comprises executable instructions for:
    an isolated operating environment; and
    a secondary operating system functional within the isolated operating environment on the personal computer,
    wherein primary data files of the personal computer are prevented from being accessed by malicious code from an external data source.

2. The software application of claim 1, wherein the isolated operating environment executable instructions include primary operating system (POS) permission code for modifying the POS permissions.

3. The software application of claim 1, wherein the isolated operating environment executable instructions include installation code for checking and setting the isolated operating environment.

4. The software application of claim 3, wherein the isolated operating environment executable instructions include installation code for checking and setting the isolated operating environment, wherein the installation code checks for a current installation condition of the software application.

5. The software application of claim 4, wherein the installation code copies any files from the software application as are necessary in view of checking for the current installation condition of the software application.

6. The software application of claim 4, wherein the installation code establishes short-cuts as are necessary in view of checking for the current installation condition of the software application.

7. The software application of claim 1, wherein the isolated operating environment executable instructions include code checking and setting the isolated operating environment start up requirements.

8. The software application of claim 7, wherein the isolated operating environment start up requirements include "freshness" of secondary operating environment (SOE) files, allocation of volatile memory to the SOE, allocation of data storage to the SOE, READ ONLY condition of the primary operating system partitions and connections, state of intranet activity, READ ONLY condition of user access to primary operating system partitions.

9. The software application of claim 1, wherein the isolated operating environment executable instructions include code checking and setting the isolated operating environment runtime requirements.

10. The software application of claim 9, wherein the isolated operating environment runtime requirements are set to provide at least two run modes.

11. The software application of claim 9, wherein the isolated operating environment runtime requirements are set to provide at least a run mode with met access and a run mode without met access.

12. The software application of claim 1, wherein the isolated operating environment executable instructions include code checking and setting the isolated operating environment exit requirements.

13. The software application of claim 1, wherein the isolated operating environment executable instructions includes code checking and setting the isolated operating environment exit requirements comprising disconnecting a secondary operating environment (SOE) from an met, closing a node interface, freeing an SOE volatile memory allocation, flushing a temporary data storage allocation, disconnecting from any SOE files and partitions, refreshing SOE boot file, and restoring an intranet connection.

14. The software application of claim 1, wherein the isolated operating environment executable instructions include code checking and setting the isolated operating environment requirements, including: allocating and connecting to a region of volatile memory for a secondary operating environment (SOE), allocating and connecting to a data storage space, providing a connection to a central processing unit of the personal computer, connecting to an external data source node, providing a connection to a video card of the computer, providing a connection to a sound card of the computer, providing a connection to a printer of the computer, providing a connection to a mouse and a keyboard of the computer, and forming a network bridge between the secondary operating system of the SOE and the primary operating system of the personal computer.

15. A method for securing a personal computer system from intrusion from an external data source comprising:
    requesting a connection with an external data source from a primary operating system; and
    accessing the external data source using a secondary operating system from within an isolated operating environment functioning separate from the primary operating system;
    wherein the isolated operating environment comprises at least one input/output (I/O) connection with the external data source, wherein the external data source is limited to operation within the isolated operating environment, and wherein the personal computer system is secured from malicious code contained in a file downloaded from the external data source.

16. The method of claim 15, further comprising:

operating a software application from within the isolated operating environment.

17. The method of claim 15, further comprising:

accessing the secondary operating system using a shortcut from the primary operating system.

18. The method of claim 15, wherein the secondary operating system is operated in a safe operations mode.

19. The method of claim 15, wherein the secondary operating system is assigned a default IP address.

20. A computer readable medium storing instructions installable on a personal computer for protecting primary data files of the personal computer from being accessed by malicious code by an external data source, the instructions comprising functionality to:

provide an isolated operating environment comprising a secondary operating system, wherein the secondary operating system functions separate from a primary operating system (POS) on the personal computer;

provide primary operating system permission codes to limit access to a node coupled to an external data source to the isolated operating environment under control of the secondary operating system;

initiate an external data source interface session via the node within the isolated operating environment;

allocate a memory space and a temporary data storage space to the secondary operating system for the duration of the session; and establish connectivity with the external data source via the node under control of the secondary operating system to isolate operative communication with the external data source to the isolated operating environment to protect the personal computer from malicious code derived from the external data source.

* * * * *